(12) United States Patent
Furukawa

(10) Patent No.: US 8,774,436 B2
(45) Date of Patent: Jul. 8, 2014

(54) DISPLAY CONTROL APPARATUS AND CONTROL METHOD THEREOF

(75) Inventor: Takeshi Furukawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1058 days.

(21) Appl. No.: 12/816,299

(22) Filed: Jun. 15, 2010

(65) Prior Publication Data
US 2011/0001876 A1    Jan. 6, 2011

(30) Foreign Application Priority Data

Jul. 2, 2009 (JP) ................................ 2009-158187

(51) Int. Cl.
*H04R 1/02* (2006.01)
*H04B 3/00* (2006.01)
*H04N 5/445* (2011.01)

(52) U.S. Cl.
USPC .............................. 381/333; 381/77; 348/563

(58) Field of Classification Search
USPC ......... 381/77, 333, 310, 1; 348/563, E05.099
See application file for complete search history.

(56) References Cited

U.S. PATENT DOCUMENTS

| 2007/0104341 A1* | 5/2007 | Kondo et al. | 381/306 |
| 2008/0165992 A1* | 7/2008 | Kondo et al. | 381/182 |
| 2010/0119092 A1* | 5/2010 | Kim et al. | 381/306 |

FOREIGN PATENT DOCUMENTS

| JP | 6-110642 A | 4/1994 |
| JP | 2000-305079 A | 11/2000 |
| JP | 2004-200815 A | 7/2004 |
| JP | 2004-302852 A | 10/2004 |
| JP | 2007-011276 A | 1/2007 |
| JP | 2007-026121 A | 2/2007 |

\* cited by examiner

*Primary Examiner* — Vivian Chin
*Assistant Examiner* — David Ton
(74) *Attorney, Agent, or Firm* — Canon USA, Inc., IP Division

(57) ABSTRACT

An image processing apparatus according to the present invention includes a display control unit configured to cause a display screen to display image data, a determination unit configured to determine a position of an audio output device on the display screen based on the position of the audio output device which is placed within a first predetermined distance from the display screen, and a transmission control unit configured to perform control to transmit, to the audio output device, audio data corresponding to the image data displayed at a position within a second predetermined distance from a position on the display screen which is determined by the determination unit.

13 Claims, 15 Drawing Sheets

FIG. 5

| | COORDINATES |
|---|---|
| AUDIO OUTPUT DEVICE | (600, 550) |

| | COORDINATES |
|---|---|
| AUDIO OUTPUT DEVICE 1020 | (600, 550) |
| AUDIO OUTPUT DEVICE 1021 | (1080, 550) |

FIG. 12

| | COORDINATES | PRESENCE OR ABSENCE OF AUDIO DATA | NUMBER OF CHANNELS |
|---|---|---|---|
| CONTENT 1040 | (700, 480) (1000, 480) (700, 630) (1000, 630) | AUDIO DATA PRESENCE | 2 (STEREO) |
| CONTENT 1041 | (180, 50) (480, 50) (180, 200) (480, 200) | AUDIO DATA PRESENCE | 1 (MONAURAL) |
| CONTENT 1042 | (180, 350) (400, 550) (30, 480) (260, 680) | AUDIO DATA ABSENCE | — |

DISPLAY CONTROL APPARATUS AND CONTROL METHOD THEREOF

BACKGROUND OF THE INVENTION

1. Field of the Invention

The present invention relates to a display control apparatus and a control method thereof. More specifically, the present invention relates to a technique to be used in outputting audio data corresponding to a content displayed by the display control apparatus.

2. Description of the Related Art

Recently, a multi-window system has been widely generally used because of widespread of personal computers (PC). The multi-window system is a system in which a plurality of virtual regions is defined on a display apparatus and different applications are allocated to each of the virtual regions.

An operator can use the plurality of applications at the same time while the operator is switching the virtual regions using an input device such as a mouse. According to improvement of technical advantages of operational equipment which processes applications, reproduction of moving image contents which requires more amount of operation can be realized by the multi-window system. By reproducing the moving image contents in the multi-window system, it becomes possible to reproduce and watch a plurality of moving image contents at the same time.

However, in the multi-window system, in a case where a plurality of pieces of data containing sound, i.e., the moving image contents, is reproduced at the same time, there is a problem that it is difficult for the operator to listen to each sound since a plurality of pieces of sound is synthesized to be output. For example, Japanese Patent Laid-open No. 06-110642 discusses the following technique as a sound synthesis technique of the multi-window system in order to resolve the above described problem. More specifically, a plurality of pieces of sound is synthesized after a sound volume of each of the plurality of pieces of sound is selected according to a distance between a pointer display position and a window. Accordingly, the sound volume of the sound of the desired application is turned up while the sound volumes of the remaining plurality of pieces of sound of the other applications is turned down.

Recently, display apparatuses represented by liquid crystal displays (LCDs) and plasma display panels (PDPs) have been more large-sized and highly defined. Further, because of a development of a graphics card which supports high resolution, more applications can be processed at the same time by using the above described multi-window system. As a result, a plurality of operators can share to use a large-sized display apparatus rather than an operator operates the large-sized display apparatus alone. For example, in Japanese Patent Laid-open No. 2000-305079 discusses a display apparatus in which the display apparatus having a table-like shape is horizontally disposed and a plurality of operators share to use the single display apparatus.

However, in a case where the plurality of operators share to use the display apparatus, there is a problem that a troublesome occurred in setting an output of the sound corresponding to the display data.

For example, in a case where each of the operators displayed a plurality of moving contents on the display apparatus, the operator is required to perform the sound volume setting and/or the stereo/monaural setting with respect to each of the moving contents. Further, in a case where operators work separately while sharing one display apparatus, the operators have to take care of the settings of the other operators.

SUMMARY OF THE INVENTION

The present invention is directed to a technique which can simplify a setting of sound to be output in a case where a display apparatus is shared by a plurality of operators.

According to an aspect of the present invention, a display control apparatus includes a display control unit configured to cause a display screen to display image data, a determination unit configured to determine a position of an audio output device on the display screen based on the position of the audio output device which is placed within a first predetermined distance from the display screen, and a transmission control unit configured to perform control to transmit, to the audio output device, audio data corresponding to the image data displayed at a position within a second predetermined distance from a position on the display screen which is determined by the determination unit.

According to the present invention, the setting of the sound to be output in a case where the plurality of operators shares the display apparatus can be simplified.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5 illustrates an example of coordinates at which an audio output device is placed.

FIG. 11 illustrates an example of coordinates of audio output devices according to the second exemplary embodiment.

FIG. 12 illustrates coordinates of contents displayed and presences or absences of audio data according to the second exemplary embodiment.

DESCRIPTION OF THE EMBODIMENTS

Various exemplary embodiments, features, and aspects of the invention will be described in detail below with reference to the drawings.

Now, exemplary embodiments of the present invention are described below in detail with reference to drawings attached hereto. In a first exemplary embodiment, a display unit is exemplified as a table-shaped display unit of which display unit is horizontally disposed. However, this is a mere example and the present invention is not to be restricted to configurations described herein.

Figure 1:
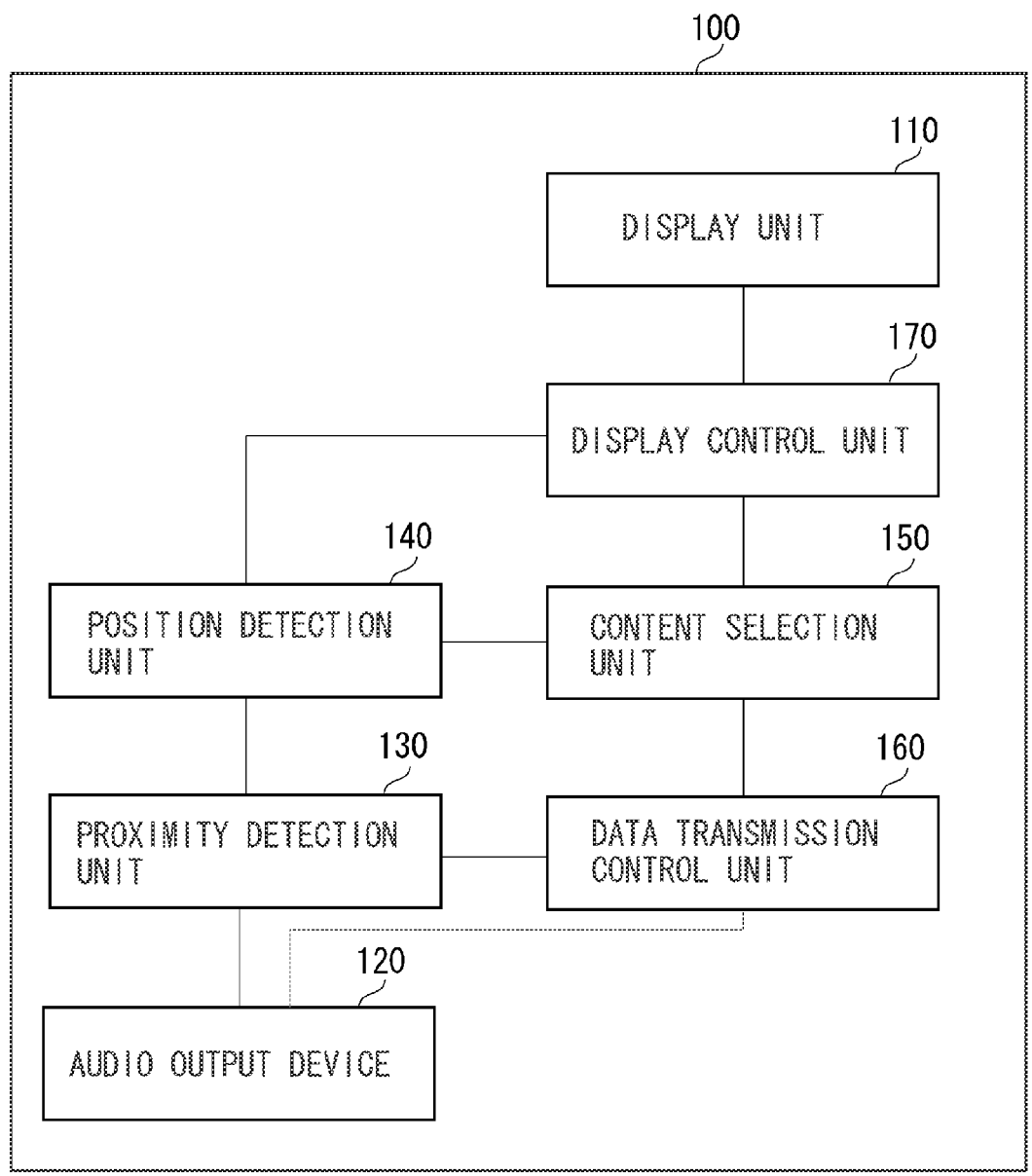
FIG. 1 is a block diagram illustrating an example of a configuration of a display control apparatus according to a first exemplary embodiment.
Figure 2:
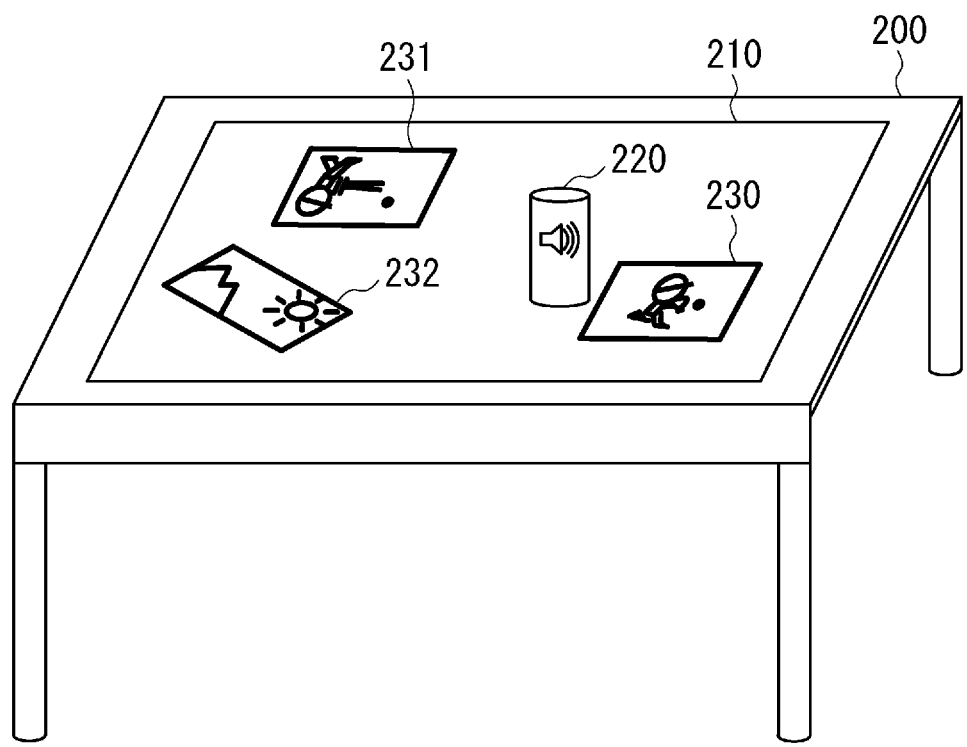
FIG. 2 illustrates an outer appearance of the display control apparatus according to the first exemplary embodiment.

FIG. 1 is a block diagram illustrating an example of a configuration of main units of a display control apparatus. FIG. 2 illustrates an outer appearance of a display control apparatus 100. A display unit 110 is a display apparatus represented by an LCD or a PDP. In the present exemplary embodiment, the display unit 110 is horizontally disposed in a manner as illustrated with a display screen 210 in FIG. 2. The display unit 110 can display images according to contents 230 through 232, e.g., photographs, moving images, texts or music files. The display unit 110 corresponds to the display screen 210 which displays content images.

In FIG. 1, an audio output device 120 outputs sound. An example of the audio output device 120 includes a speaker. In the present exemplary embodiment, as it is illustrated by a device 220 in FIG. 2, the audio output device 120 is placed and used on the display unit 110 which is horizontally disposed with respect to the ground. Further, in a case where the audio output device 120 is a small-sized transportable speaker, such a speaker is more desirable to be used in the present exemplary embodiment.

A proximity detection unit 130 detects the audio output device in proximity to the display unit 110. In other words, the proximity detection unit 130 detects the audio output device which is placed at a position within a predetermined distance (first predetermined distance) from the display unit 110 (display screen). The proximity detection unit 130 of the present exemplary embodiment detects an object in proximity to the display unit 110 using a sensor provided on a surface of the display unit 110. Then, the proximity detection unit 130 determines whether the object is the audio output device according to a communication with the object. After detecting the audio output device 120 in proximity to the display unit 110, the proximity detection unit 130 establishes a communication with the audio output device 120 via a data transmission control unit 160. In the present exemplary embodiment, the data transmission control unit 160 acquires information relating to the audio output device 120 and establishes a communication with the audio output device 120 using a publicly known wireless communication technique, such as Bluetooth.

A position detection unit 140 determines a position of the audio output device 120 on the display unit 110 which is detected by the proximity detection unit 130. The position detection unit 140 of the present exemplary embodiment determines the position of the audio output device 120 on the display unit 110 (corresponding to the display screen 210) based on a position at which a perpendicular line from the detected position of the audio output device 120 to the display unit 110 crosses the display screen 210. When the audio output device is in contact with the display unit 110, the position detection unit 140 of the present exemplary embodiment determines that a center of a contact area is the position of the audio output device 120 on the display unit 110.

A content selection unit 150 outputs audio data corresponding to a content existing in adjacent to the position of the audio output device 120 detected by the proximity detection unit 130 to a data transmission control unit 160. In other words, the content selection unit 150 determines whether there is the content (i.e., image data) displayed at a position within a predetermined distance (i.e., a second predetermined distance) from a position determined by the position detection unit 140. Then, if there is the content at the position within a range of the second predetermined distance, the content selection unit 150 outputs the corresponding audio data to the data transmission control unit 160. The data transmission control unit 160 transmits the audio data output by the content selection unit 150 to the audio output device 120 by the wireless communication.

A display control unit 170 controls reproduction of the contents 230 through 232 and display positions of the contents. Further, the display control unit 170 causes the display unit to display a range indicating image (i.e., a proximity circle) which indicates a range within the predetermined distance (i.e., the second predetermined distance) from the position of the audio output device 120 which is determined by the position detection unit 140. The content selection unit 150 outputs the audio data corresponding to the content (i.e., the image data) of which display area overlaps the range indicating image. In the outer appearance in FIG. 2, the proximity detection unit 130, the position detection unit 140, the content selection unit 150, the data transmission control unit 160 and the display control unit 170 are not illustrated therein. However, it is understood that those components are installed within a display control apparatus 200.

Now, a processing procedure executed by the display control apparatus of the present exemplary embodiment is described below with reference to a flow chart in FIG. 3. FIG. 4 illustrates a state that a display unit 410 displays contents 440 through 442 and an audio output device 420 is placed on the display unit 410. The present exemplary embodiment is described below with reference to the flow chart in FIG. 3 and the drawings corresponding thereto.

Figure 3:
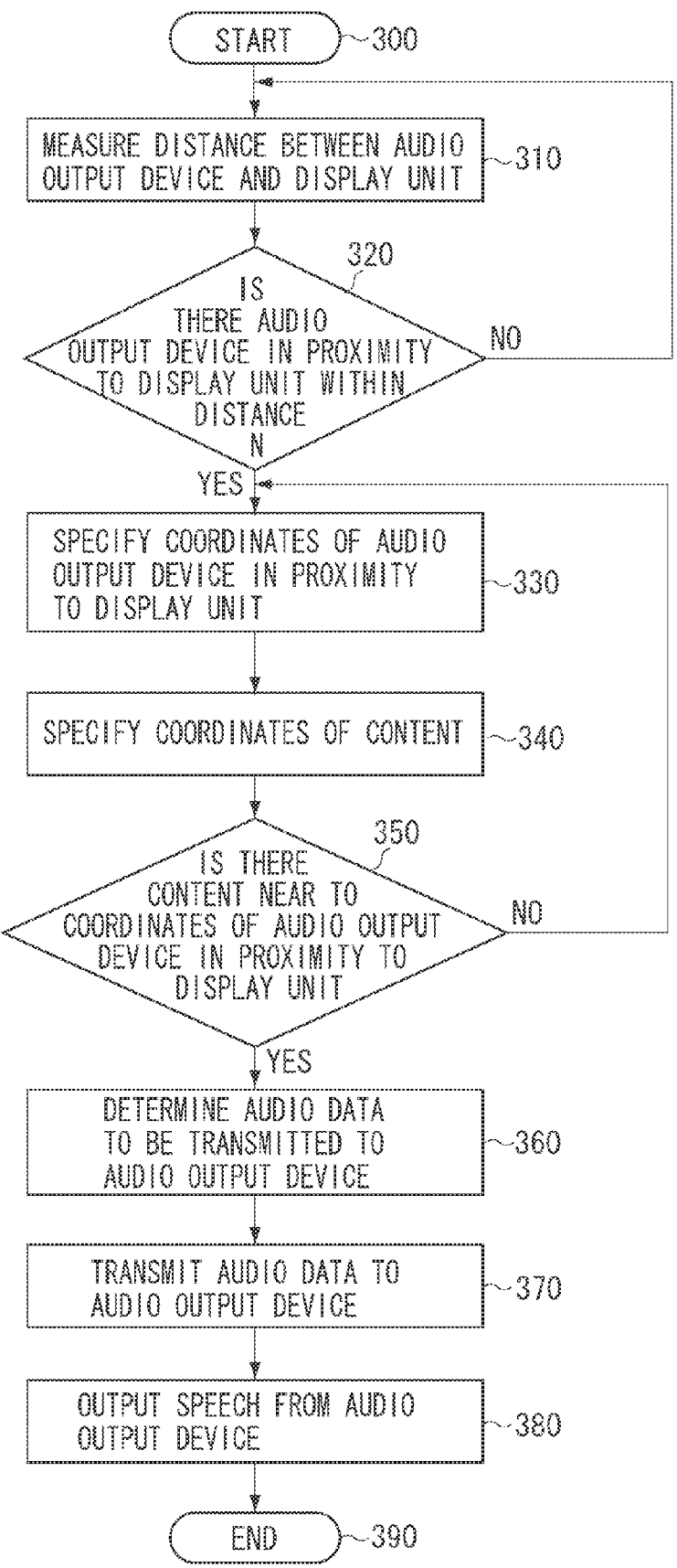
FIG. 3 is a flow chart illustrating processing of the display control apparatus according to the first exemplary embodiment.
Figure 4:
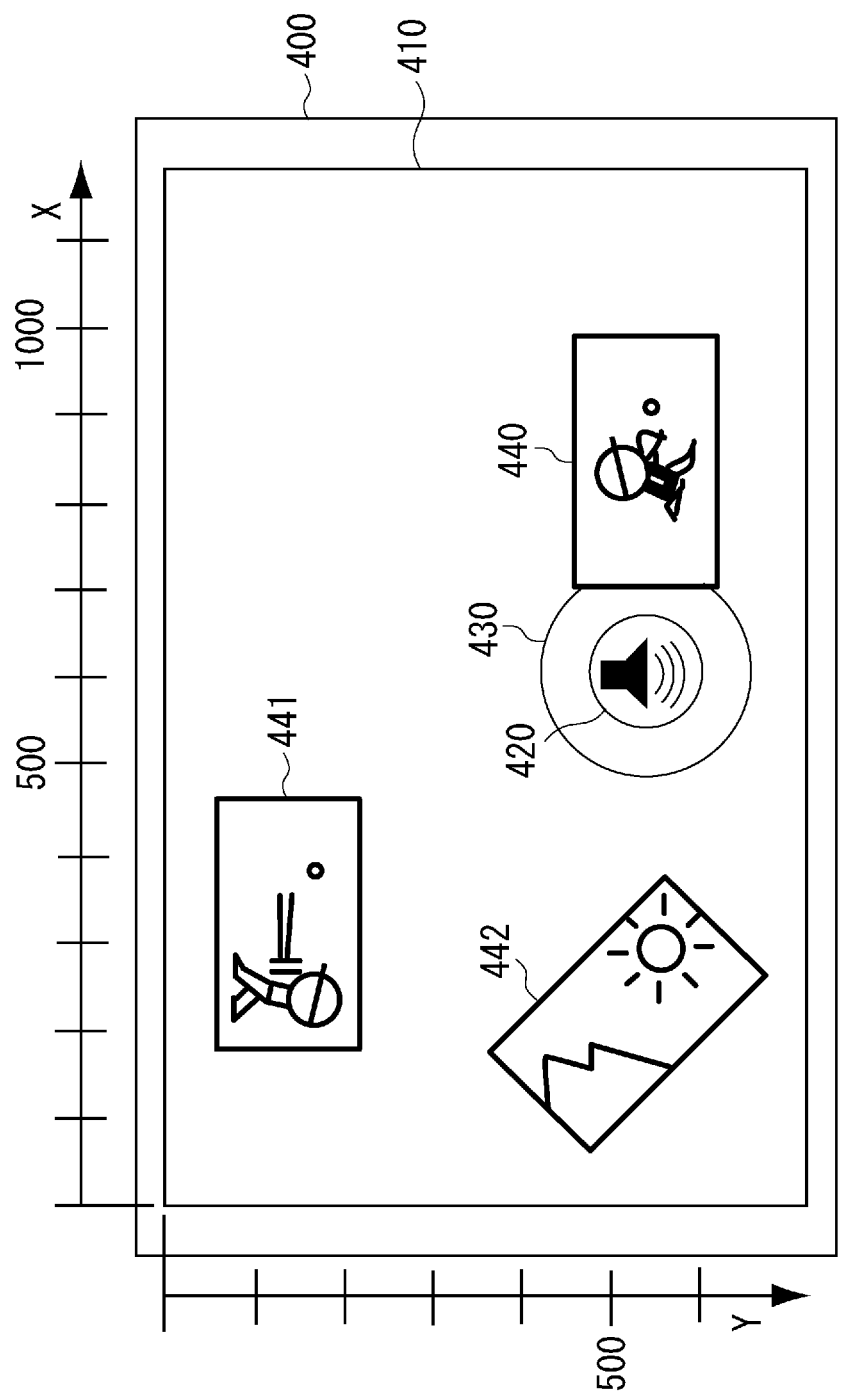
FIG. 4 illustrates an example of a display screen according to the first exemplary embodiment.

In step 310 of the flow chart illustrated in FIG. 3, the proximity detection unit 130 measures a distance between the audio output device 120 and the display unit 110. The audio output device 420 is placed on the display unit 410, so that the distance measured by the proximity detection unit 130 is 0 cm.

In step 320, the proximity detection unit 130 determines whether there is the audio output device 120 which is in proximity to a position within a distance N (i.e., the first predetermined distance). In the present exemplary embodiment, the distance N is 3 cm. The distance between the audio output device 420 and the display unit 410 measured in step 310 is 0 cm, and therefore the distance is within a range of 3 cm of the distance N. As a result, the audio output device 420 is detected.

On the other hand, as a result of the determination in step 320, if there is no audio output device within a range of 3 cm around the display unit 410 (NO in step 320), the processing proceeds to step 310, where the distance between the display unit and the audio output device in proximity to the display unit is measured again. Therefore, when the distance is more than N, processing in step 310 and step 320 are repeated every predetermined times, thereby measuring the distance again and again. In the present exemplary embodiment, a time interval before re-measuring the distance is set to 0.5 sec. In the present exemplary embodiment, as a result of the determination in step 320, the proximity detection unit 130 determined that there is the audio output device 120 within the range of the distance of 3 cm (YES in step 320), so that the processing proceeds to step 330.

In step 330 (i.e., determination processing), the position detection unit 140 determines coordinates of the audio output device 420 which is determined as the one in proximity to the display unit 110 by the proximity detection unit 130. More specifically, the position detection unit 140 determines the position of the audio output device 420 on the display unit 110 based on the position of the audio output device 420 which is placed at a position within the predetermined distance (i.e., the first predetermined distance) between the display unit 110 (i.e., the display screen 410) and the audio output device 420. The position detection unit 140 of the present exemplary embodiment determines the position of the audio output device 420 on the display screen 410 based on a position at which a perpendicular line from the detected position of the audio output device 420 to the display screen 410 crosses the display screen 410. When the audio output device 420 is in contact with the display unit 410, the position detection unit 140 of the present exemplary embodiment determines that a center of the contact area is the position of the audio output device 420 on the display screen 410. In the present exemplary embodiment, an upper left position of the display unit 410 is provided with coordinates (x, y)=(0, 0) in FIG. 4. Further, the audio output device 420 is placed at the coordinates (x, y)=(600, 550) which is shown in FIG. 5. The position detection unit 140 determines that the coordinates of the audio output device 420 on the display unit 410 is (x, y)=(600, 550).

In step 340, the content selection unit 150 determines coordinates of the contents 440 through 442 which are controlled by the display control unit 170. The contents 440 through 442 are indicated by coordinates 610 through 612 in FIG. 6 on the display unit 410, respectively.

In step 350, the content selection unit 150 determines whether there is a content in the adjacent to the audio output device 420. In this determination, a content which is displayed contacting a proximity circle 430 with a radius (100) around the coordinates of the audio output device 420 on the display screen 410 is determined as the content which exists in the adjacent to the audio output device 420. The content selection unit 150 performs an intersection point calculation based on the proximity circle 430 of the audio output device 420 and the coordinates of each of the contents 440 through 442. In other words, the display control unit 170 causes the display unit 410 to display the range indicating image (i.e., proximity circle 430) which indicates a range within the second predetermined distance (i.e., the radius 100) from a position of the audio output device 420 on the display screen 410. Then, the content selection unit 150 determines whether there is the content (i.e., the image data) of which display area overlaps with the range indicating image.

As a result of the determination in step 350, when the content selection unit 150 determines that there is the content of which display area overlaps with the proximity circle 430 of the audio output device 420 (YES in step 350), the processing proceeds to step 360. Or, when the content selection unit 150 determines that there is no content of which display area overlaps with the proximity circle 430 of the audio output device 420 (NO in step 350), the processing returns to step 330. Subsequently, the content selection unit 150 checks whether there is the content in the adjacent to the audio output device 420 by repeating the processing in step 330, step 340 and step 350 every predetermined interval.

In the present exemplary embodiment, when the content selection unit 150 determines that the display area of the content 440 overlaps with the proximity circle 430 of the audio output device 420 (YES in step 350), the processing proceeds to step 360. In step 360, the content selection unit 150 determines the content which outputs the sound. More specifically, the content selection unit 150 determines whether there is the audio data corresponding to the content in the adjacent to the audio output device 420. Then, the content selection unit 150 acquires the audio data if the content displayed in the adjacent to the audio output device 420 is the content having the audio data, such as moving images or music files.

Figure 6:
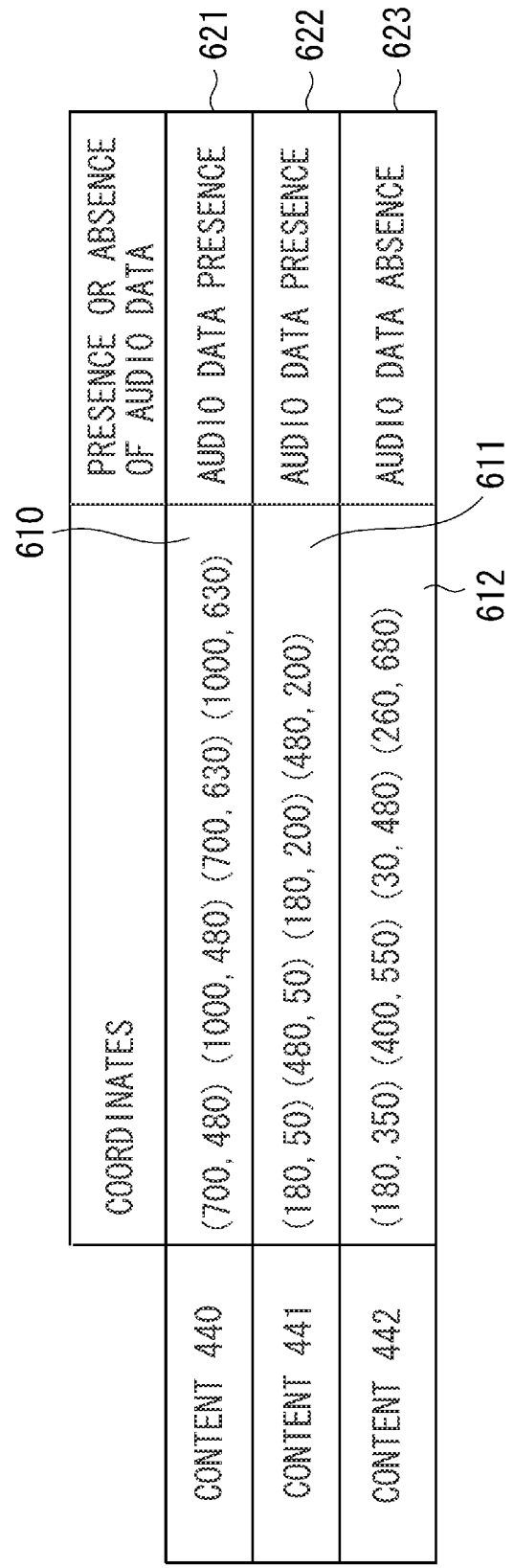
FIG. 6 illustrates coordinates of contents displayed and presences or absences of audio data.

On the other hand, the content selection unit 150 does not acquire the audio data if the content displayed in the adjacent to the audio output device 420 is the content which does not have the audio data, such as photographs or texts. FIG. 6 illustrates presence or absence of the audio data of each of the contents 440 through 442 of the present exemplary embodiment. The content 440 which overlaps with the proximity circle 430 has the audio data, so that the audio data of the content 440 is selected. Then, the processing proceeds to step 370.

In step 370 (transmission control processing), the data transmission control unit 160 transmits the audio data determined by the content selection unit 150 to the audio output device 420. More specifically, the data transmission control unit 160 controls such that the audio data corresponding to the image data (i.e., the content 440) displayed at a position within the second predetermined distance (radius 100) from a position on the display screen (i.e., on the display unit 410) determined by the position detection unit 140 is transmitted. In the present exemplary embodiment, the audio data of the content 440 is transmitted to the audio output device 420 by using the publicly known wireless communication technique such as the Bluetooth.

Then, the processing proceeds to step 380 where the audio output device 420 outputs the audio data transmitted from the data transmission control unit 160. Accordingly, in the present exemplary embodiment, the audio data of the content 440 is output from the audio output device 420.

Figure 7:
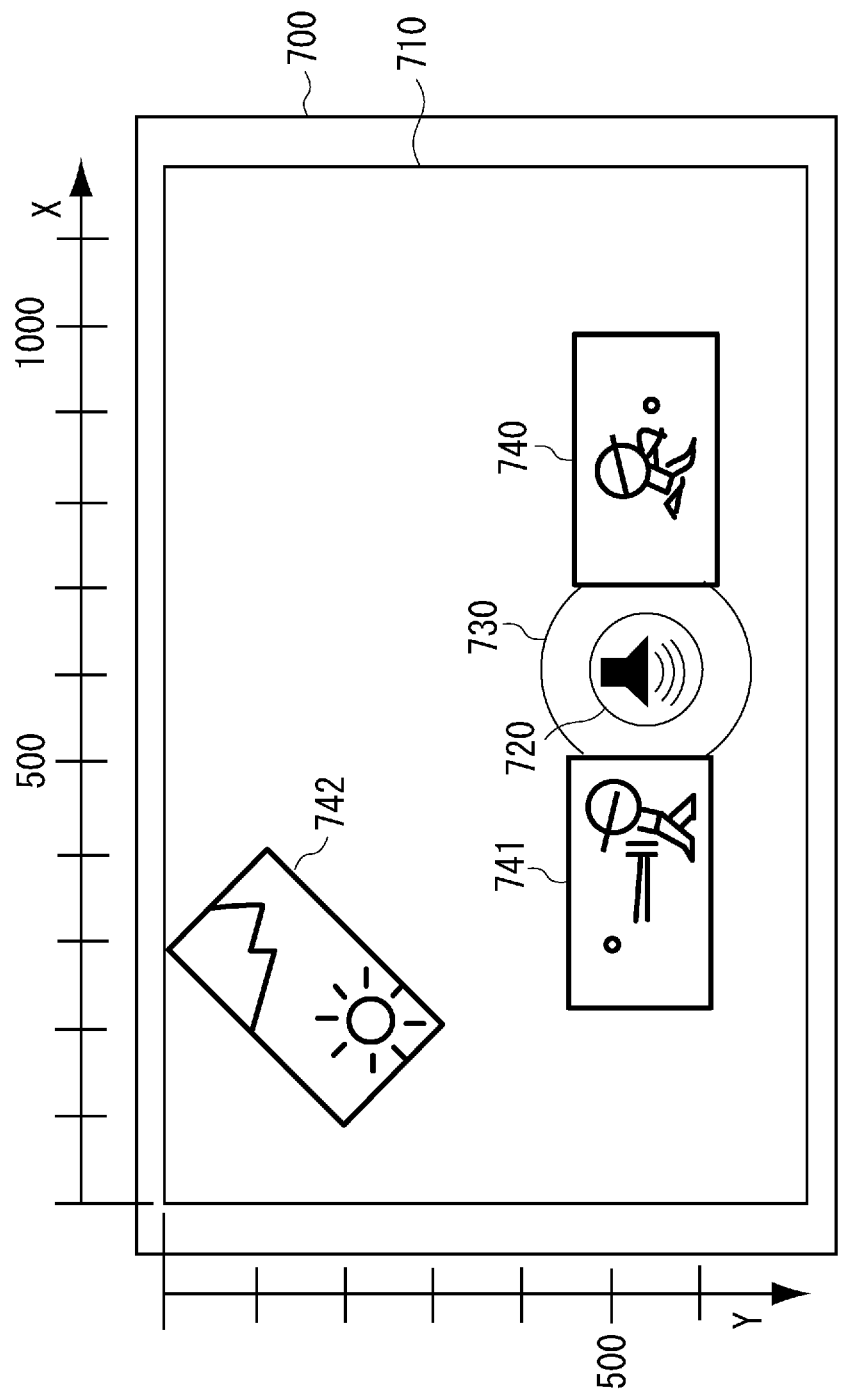
FIG. 7 illustrates an example of a display screen according to the first exemplary embodiment.

Now, FIG. 7 illustrates a state that two contents overlap with a proximity circle 730 of an audio output device 720. In this case, contents 740 and 741 overlap with the proximity circle 730 of the audio output device 720. When both of the contents 740 and 741 have the audio data, in step 360, the content selection unit 150 synthesizes the audio data of the contents 740 and 741 and outputs the synthesized audio data to the data transmission control unit 160. In step 370, the data transmission control unit 160 transmits the synthesized audio data to the audio output device 720. The content selection unit 150 of the present exemplary embodiment synthesizes the audio data of the contents 740 and 741 such that a sound volume of the audio data of the content nearer to the audio output device 720 between the contents 740 and 741 becomes larger.

As described above, the display control apparatus 100 of the present exemplary embodiment causes the display unit 110 (i.e., the display screen 410) to display the content (i.e., the image data). Further, the position detection unit 140 determines a position on the display unit 110 corresponding to the position of the audio output device 120 within the predetermined distance (i.e., the first predetermined distance) from the display unit 110. Then, the data transmission control unit 160 transmits the audio data corresponding to the content (i.e., the image data) displayed within the predetermined distance (i.e., the second predetermined distance) from the position on the display unit 110 determined by the position detection unit 140 to the audio output device 120. Accordingly, when a plurality of operators shares the display apparatus, the sound of a desired content can be output from the audio output device by the operator bringing the audio output device near to the content.

Figure 8:
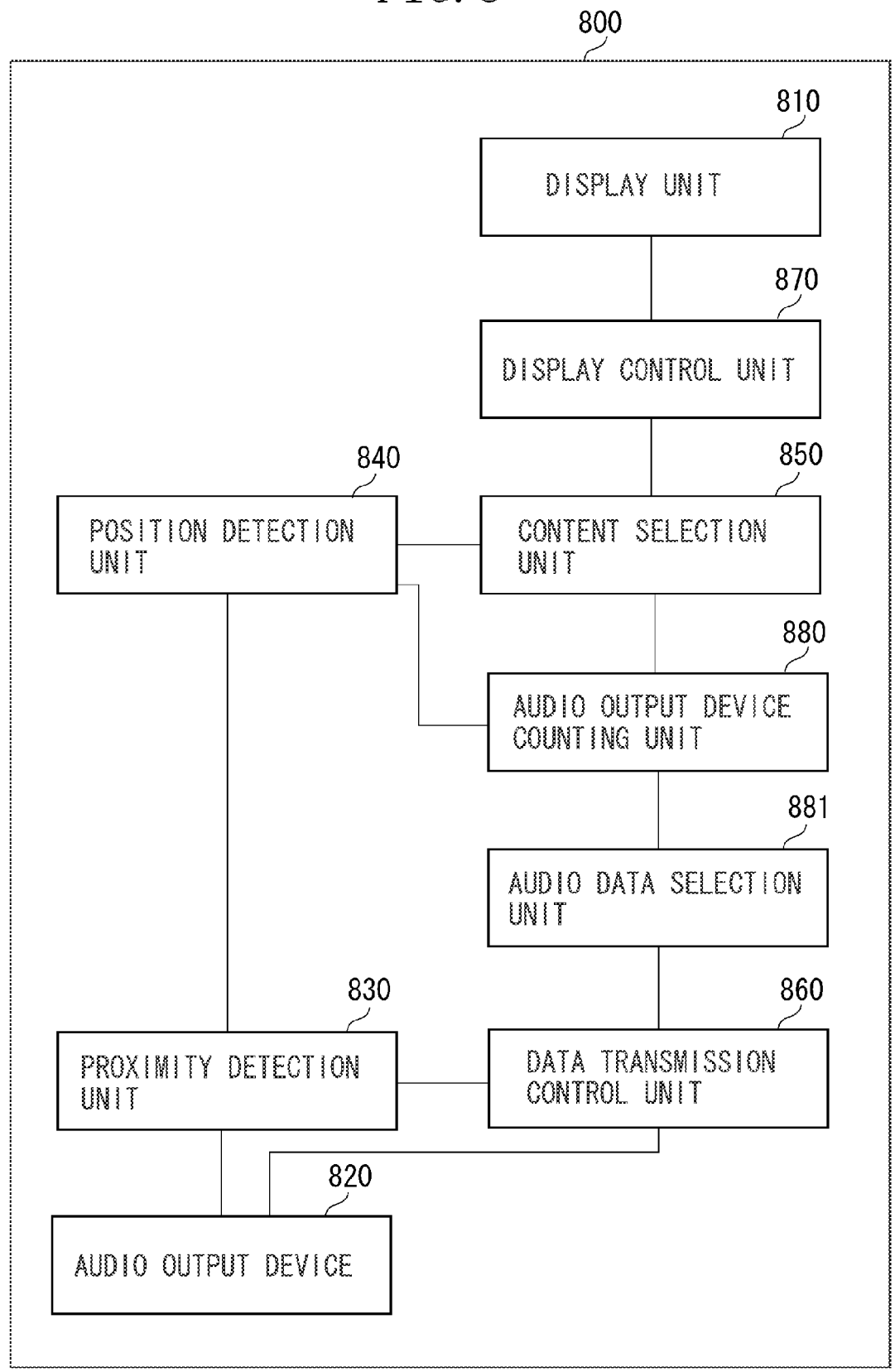
FIG. 8 is a block diagram illustrating an example of a configuration of a display control apparatus according to a second exemplary embodiment.

Now, a second exemplary embodiment is described below mainly about differences with respect to the first exemplary embodiment. FIG. 8 illustrates an example of a functional configuration of a display control apparatus 800 according to the second exemplary embodiment. Similar to the first exemplary embodiment, a display unit 810 is a display apparatus represented by an LCD and a PDP. The display unit 810 corresponds to a display screen 1010 in FIG. 10.

In FIG. 8, an audio output device 820 is, for example, a speaker which outputs sound. A proximity detection unit 830 detects an audio output device in proximity to the display unit 810. In other words, the proximity detection unit 830 detects the audio output device which is placed at a position within a predetermined distance (first predetermined distance) from the display unit 810. A position detection unit 840 determines a proximity position of the audio output device 820 which is detected by the proximity detection unit 830. The position detection unit 840 determines a position of the audio output device on the display unit 810 within the first predetermined distance from the display unit 810.

A content selection unit 850 outputs audio data corresponding to a content which exists in adjacent to the position of the audio output device 820 which is detected by the proximity detection unit 830 to a data transmission control unit 860. In other words, the content selection unit 850 determines whether there is a content (i.e., image data) which is displayed at a position within the predetermined distance (i.e., the second predetermined distance) from the position determined by the position detection unit 840. When there is the content at a position within a range of the second predetermined distance, the content selection unit 850 outputs the corresponding audio data to an audio data selection unit 881.

The audio data selection unit 881 selects the audio data to be transmitted to the audio output device 820 via the data transmission control unit 860 according to the number of the audio output devices 820 in proximity to the display unit 810. Further, the audio data selection unit 881 converts the audio data according to the number of audio output devices 820 in proximity to the display unit 810. The number of audio output devices 820 in proximity to the display unit 810 is obtained by an audio output device counting unit 880. More specifically, the audio data selection unit 881 determines the audio data to be transmitted to the audio output device according to the number of the audio output devices 820 which is obtained by the audio output device counting unit 880. Then, the audio data selection unit 881 outputs the audio data which is determined to be transmitted to the audio output device to the data transmission control unit 860. The data transmission control unit 860 transmits the audio data selected and converted by the audio data selection unit 881 to each of the audio output devices using a wireless communication.

A display control unit 870 controls a display position or reproduction of a content (i.e., image data). The display control unit 870 causes the display unit to display a range indicating image (i.e., a proximity circle) which indicates a range within the predetermined distance (i.e., the second predetermined distance) from a position of the audio output device 820 determined by the position detection unit 840. The content selection unit 850 outputs the audio data corresponding to the content (i.e., the image data) of which display area overlaps with the range indicating image to the audio data selection unit 881.

Figure 9:
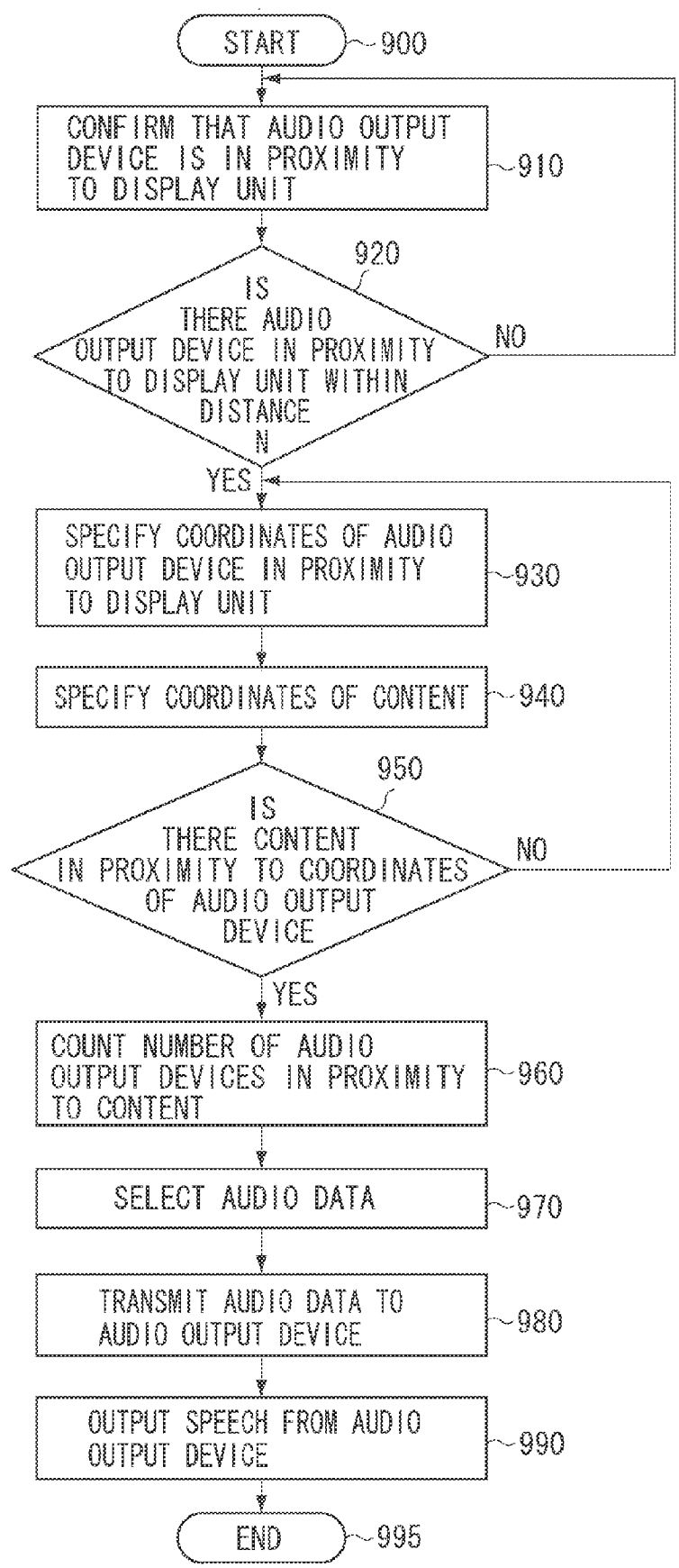
FIG. 9 is a flow chart illustrating processing of a display control apparatus according to the second exemplary embodiment.
Figure 10:
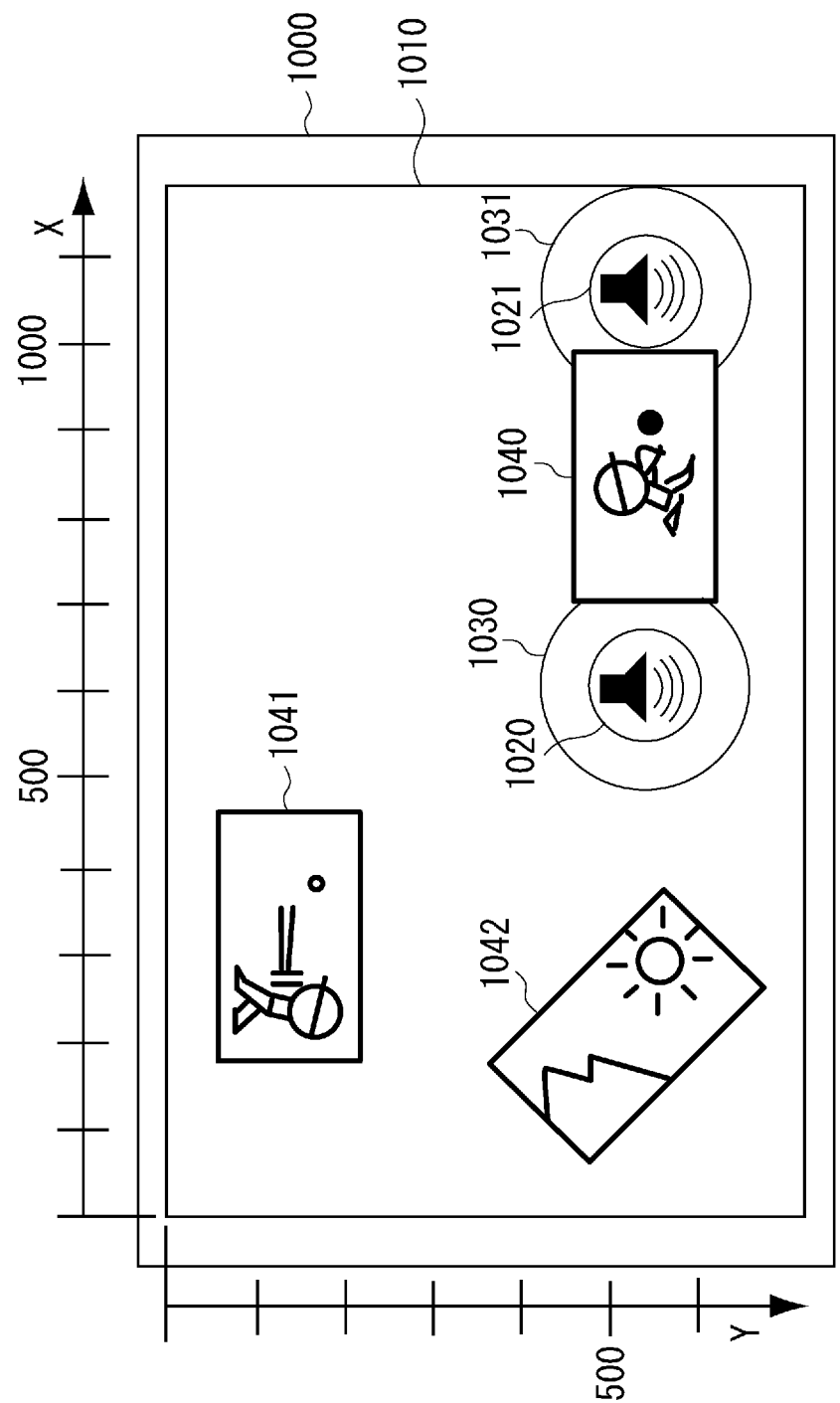
FIG. 10 illustrates an example of a display screen according to the second exemplary embodiment.

FIG. 9 is a flow chart illustrating a processing procedure executed by the display control apparatus 800 of the present exemplary embodiment. FIG. 10 illustrates a state that a display screen 1010 of a display control apparatus 1000 displays contents 1040 through 1042 and audio output devices 1020 and 1021 are placed on the display screen 1010. FIG. 11 shows coordinate information about the audio output devices 1020 and 1021 which are in proximity to the contents. FIG. 12 shows information about the contents displayed on the display unit. As shown in FIG. 12, the content 1040 has dual-channel stereo audio data. The content 1041 has a single-channel monaural audio data. The content 1042 has no audio data.

In steps 910 through 950, similar to the first exemplary embodiment, the coordinates of the audio output device 820 on the display screen 1010 which is in proximity to the display unit 810 (i.e., the display screen 1010) is determined. Further, an intersection point calculation is performed with respect to the coordinates of the contents and the proximity circle of the audio output device 820 and the content in proximity to the audio output device 820 is selected. In the present exemplary embodiment, two audio output devices 1020 and 1021 are detected as the audio output devices which are in proximity to the display unit 810 as illustrated in FIG. 10. More specifically, the audio output device counting unit 880 counts two audio output devices at positions within the predetermined distance (i.e., the second predetermined distance) from the display area of one of the contents (i.e., a content 1040). As shown in FIG. 11, the coordinates of the audio output devices 1020 and 1021 are determined as (x, y)=(600, 550) and (x, y)=(1080, 550), respectively.

As illustrated in FIG. 10, there are three contents displayed on the display screen 1010. The contents 1040 through 1042 are displayed in an area enclosed by the coordinates 1210 through 1212 shown in FIG. 12. As a result of the intersection point calculation in step 950, it is determined that the display area of the content 1040 overlaps with proximity circles 1030 and 1031 of the two audio output devices 1020 and 1021.

In this case (YES in step 950), the processing proceeds from step 950 to step 960. In step S906, the audio output device counting unit 880 counts the number of the audio output devices in proximity to the content. In other words, the audio output device counting unit 880 counts the number of the audio output devices which are placed at positions within the predetermined distance (i.e., the second predetermined distance) from the display area of one of the contents (i.e., the content 1040). In the present exemplary embodiment, it is determined that two audio output devices 1020 and 1021 are in proximity to the content 1040.

In step 970, the audio data selection unit 881 selects audio data to transmit. In the present exemplary embodiment, as it is shown in FIG. 12, the content 1040 has dual-channel stereo audio data. The audio data selection unit 881 determines to transmit audio data of a single-channel with each of the audio output devices since two audio output devices are in proximity to the content 1040. More specifically, the audio data selection unit 881 acquires the number of pieces of the audio data (i.e., the number of channels) corresponding to one of the contents (i.e., the content 1040). Then, if the number of pieces of the acquired audio data is equal to the number of the audio output devices in proximity to the content 1040, the audio data selection unit 881 determines the audio data to transmit such that the audio data having one audio channel is transmitted to one audio output device.

In step 980, the data transmission control unit 860 transmits the audio data selected by the audio data selection unit 881 to the audio output device 820. In the present exemplary embodiment, the single-channel sound is transmitted to the audio output device 1020 and the dual-channel sound is transmitted to the audio output device 1021.

In step 990, the audio output devices 1020 and 1021 reproduce the single-channel sound and the dual-channel sound respectively, so that a stereo reproduction can be realized. As described above, when the number of audio channels is equal to the number of audio output devices, each of the audio output devices is allocated with one channel.

When the number of audio channels corresponding to the content is larger than the number of the audio output devices in proximity to the content, the data transmission control unit 860 determines to synthesize and output the sound having the plurality of audio channels. In the present exemplary embodiment, when there is only one audio output device which is in proximity to the content 1040 having the dual-channel stereo audio data, the audio output device outputs the sound after the dual-channel audio data of the content 1040 is synthesized. To the contrary, when the number of audio channels is less than the number of the audio output devices, one channel is allocated to each of the audio output devices and the remaining audio output devices output the sound after the audio channels are synthesized.

Figure 13:
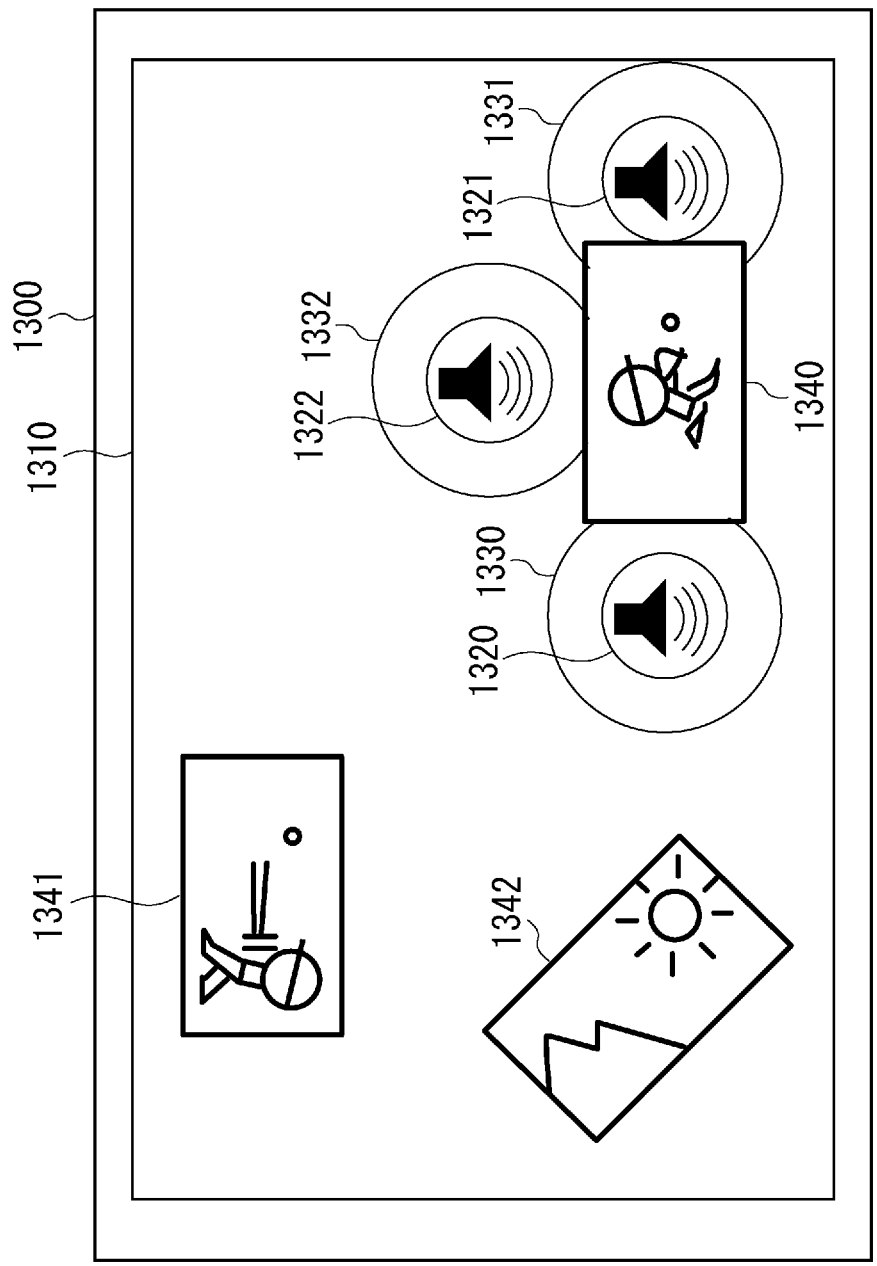
FIG. 13 illustrates an example of a display screen according to the second exemplary embodiment.

FIG. 13 illustrates a case where the number of audio channels is less than the number of audio output devices. FIG. 13 illustrates a display control apparatus 1300, a display unit (i.e., a display screen) 1310, audio output devices 1320 through 1322, proximity circles 1330 through 1332, and contents 1340 through 1342. In the example in FIG. 13, three audio output devices 1320 through 1322 are in proximity to the content 1340 having dual-channel stereo audio data.

In this case, the audio output device 1320 outputs a single-channel sound, the audio output device 1321 outputs the dual-channel sound, and the audio output device 1322 outputs sound that the single-channel sound is synthesized with the dual-channel sound.

As described above, the display control apparatus 800 of the present exemplary embodiment causes the display unit 810 (i.e., the display screen 1010) to display the content (i.e., image data). The position detection unit 840 determines positions of the plurality of audio output devices 820 on the display unit 810 based on a position of each of the plurality of audio output devices 820 placed within the predetermined distance (i.e., the first predetermined distance) from the display unit 810. When there is a content (i.e., image data) displayed at a position within the predetermined distance (i.e., the second predetermined distance) from each of the plurality of positions determined by the position detection unit 840, the data transmission control unit 860 determines the audio data to be output in a manner described below.

More specifically, if the number of the audio output devices in proximity to the content is equal to the number of pieces of the audio data (i.e., the number of audio channels), the audio data to be transmitted is determined such that one piece of audio data of one audio channel is transmitted to one audio output device. When the number of the audio output devices in proximity to the content is larger than the number of pieces of the audio data (i.e., the number of audio channels), the data transmission control unit 860 determines the audio data to be transmitted in a manner described below. More specifically, a piece of audio data of one audio channel is transmitted to one audio output device and the pieces of the audio data of each of the audio channels are synthesized with each other and transmitted to the remaining audio output devices. When the number of the audio output devices in proximity to the content is less than the number of pieces of the audio data, the data transmission control unit 860 determines the audio data to be transmitted such that the pieces of the audio data of each of the audio channels are synthesized with each other and transmitted to each of the audio output devices.

Accordingly, the number of channels to be reproduced can be changed by the operator changing the number of audio output devices placed in proximity to the content.

Figure 14:
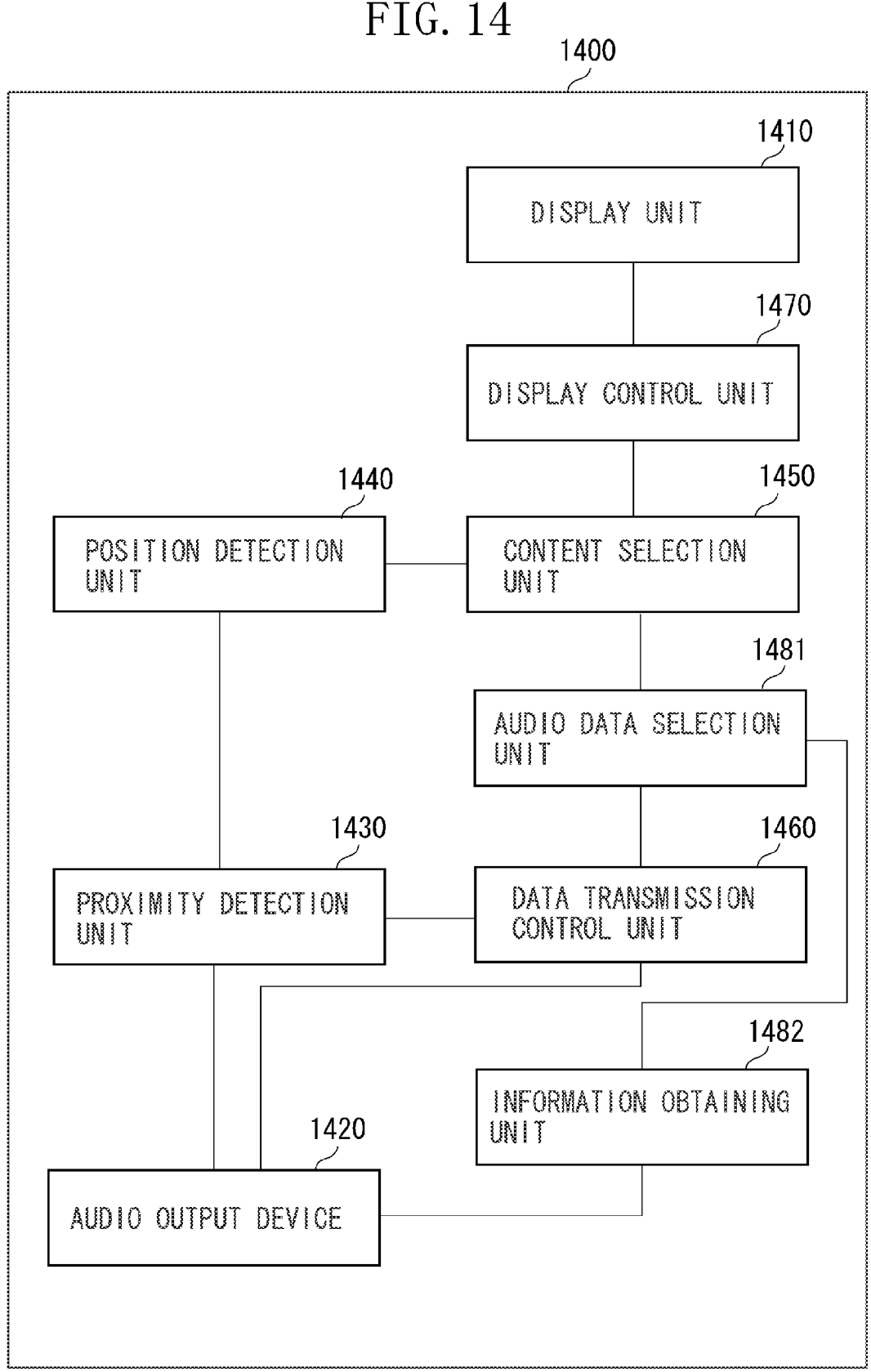
FIG. 14 is a block diagram illustrating an example of a configuration of a display control apparatus according to a third exemplary embodiment.

FIG. 14 illustrates an example of a functional configuration of a display control apparatus 1400 according to a third exemplary embodiment. In this case, similar to the first exemplary embodiment, a display unit 1410 is the display apparatus represented by the LCD or the PDP.

An audio output device 1420 is, for example, a speaker which outputs sound. A proximity detection unit 1430 detects an audio output device 1420 in proximity to the display unit 1410. A position detection unit 1440 determines a position of the audio output device 1420 which is detected by the proximity detection unit 1430 on the display unit 1410. A content selection unit 1450 outputs audio data of the content which is displayed at a position within the predetermined distance (i.e., the second predetermined distance) from the position of the audio output device 1420 determined by the position detection unit 1440 to an audio data selection unit 1481.

An information obtaining unit 1482 obtains information stored by the audio output device 1420. The information stored by the audio output device 1420 is, for example, a range which can be output by the output device 1420. The information may be a range of rated frequency.

The audio data selection unit 1481 selects audio data to be transmitted to the audio output device 1420 by the wireless communication via the data transmission control unit 1460 based on the number of audio output devices 1420 in proximity to the display unit 1410 and the information about the audio output devices obtained by the information obtaining unit 1482. The audio data selection unit 1481 converts (divides) the audio data received from the content selection unit 1450 based on the number of audio output devices 1420 and the information about the audio output devices. The data transmission control unit 1460 transmits the audio data selected and converted by the audio data selection unit 1481 to each of the audio output devices by the wireless communication.

A display control unit 1470 controls display positions and reproduction of the contents. The display control unit 1470 causes the display unit to display the range indicating image (i.e., the proximity circle) which indicates a range within the predetermined distance (i.e., the second predetermined distance) from the position of the audio output device 1420 which is determined by the position detection unit 1440. Namely, the display control unit 1470 displays the range indicating image. The content selection unit 1450 outputs the audio data corresponding to the content (i.e., the image data) of which display area overlaps with the range indicating image to the audio data selection unit 1481.

Figure 15:
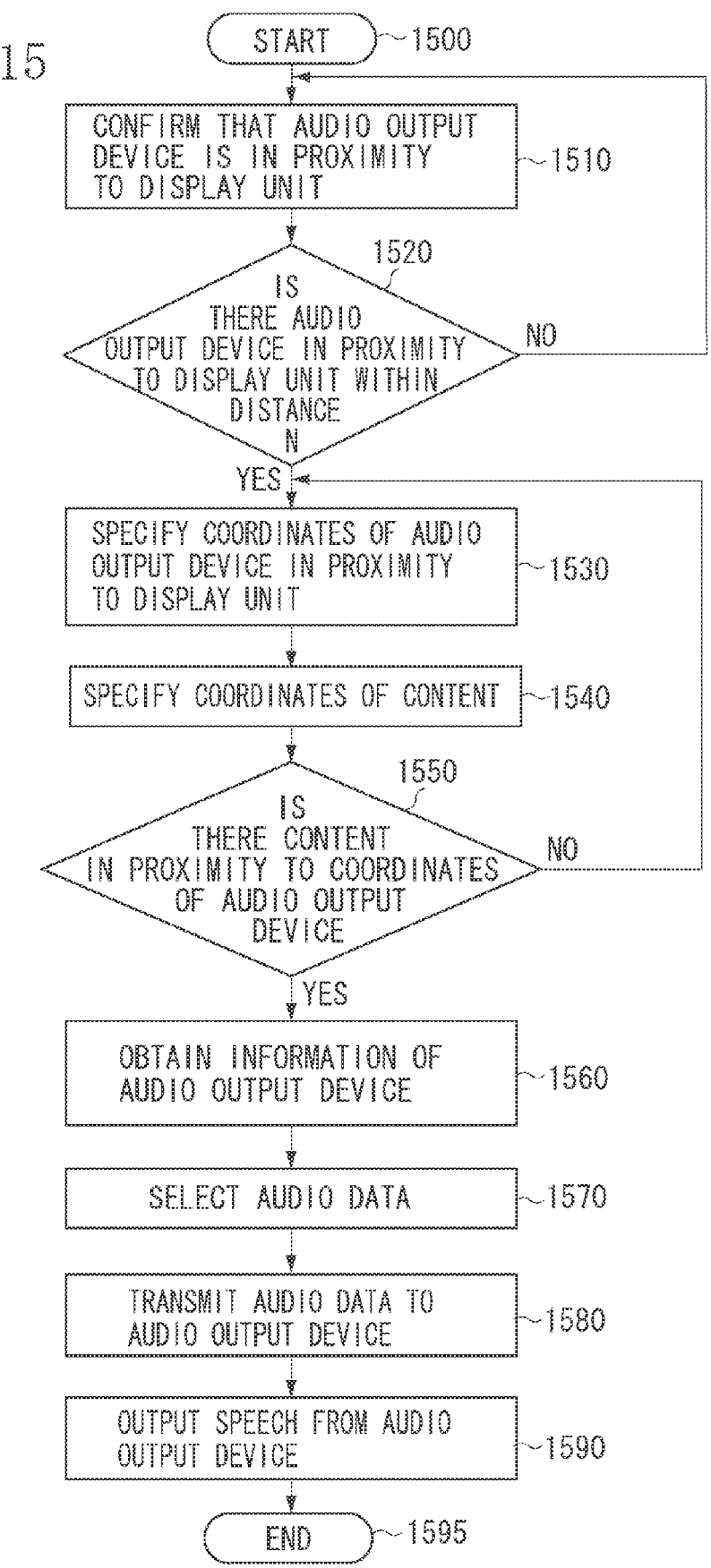
FIG. 15 is a flow chart illustrating processing of the display control apparatus according to the third exemplary embodiment.

FIG. 15 is a flow chart illustrating a processing procedure executed by a display control apparatus 1500 of the present exemplary embodiment. FIG. 13 illustrates a state that the display unit 1310 of the display control apparatus 1300 displays the contents 1340 through 1342 and the audio output devices 1320, 1321, and 1322 are placed on the display unit 1310. More specifically, the audio output devices 1320, 1321 and 1322 are in proximity to the display unit 1310. In the present exemplary embodiment, ranges that the audio output devices 1320, 1321, and 1322 can output are a high-tone range, a middle-tone range, and a low-tone range, respectively. The audio output devices 1320, 1321 and 1322 respectively store information about the range which can be output.

Similar to the first exemplary embodiment, in steps 1510 through 1550, the coordinates of the audio output devices 1320, 1321 and 1322 which are in proximity to the display unit 1310 on the display unit 1310 are determined. Further, the content selection unit 1450 performs an operation of, for example, the intersection point calculation between the display area of the content and the proximity circles of the audio output devices 1320, 1321 and 1322. Then, the content selection unit 1450 outputs the audio data of the selected content to the audio data selection unit 1481. In this example, it is determined that the audio output devices 1320, 1321 and 1322 are placed at positions within the second predetermined distance from the display area of the content 1340. More specifically, in step 1550, the content selection unit 1450 determines that there is a piece of image data (i.e., the content 1340) displayed at a position within the second predetermined distance from a plurality of positions determined by the position detection unit 1440.

In step 1560, the information obtaining unit 1482 obtains the ranges which can be output and which are stored by the audio output devices 1320, 1321 and 1322 in proximity to one of the contents (i.e., the content 1340). The information obtaining unit 1482 obtains the information which indicates that the ranges that the audio output devices 1320, 1321 and 1322 can output are the high-tone range, the middle-tone range and the low-tone range, respectively.

In step 1570, the audio date selection unit 1481 selects the audio data output by the content selection unit 1450 to divide the data. In this example, the audio data selection unit 1481 divides the audio data of the content 1340 according to the range thereof.

In step 1580, the data transmission control unit 1460 transmits the audio data divided by the audio data selection unit 1481 to the audio output device according to the range thereof. More specifically, the data transmission control unit 1460 transmits the audio data of the content 1340 having the high-tone range to the audio output device 1320. Further, the data transmission control unit 1460 transmits the audio data of the content 1340 having the middle-tone range to the audio output device 1321, and transmits the audio data of the content 1340 having the low-tone range to the audio output device 1322.

In step 1590, the audio output devices 1320, 1321, and 1322 output pieces of the audio data having the high-tone range, the middle-tone range, and the low-tone range, respectively.

As described above, the information obtaining unit 1482 of the present exemplary embodiment obtains information about the range of the audio output device. Then, when there is a piece of image data (i.e., the content 1340) which is displayed at a position within the second predetermined distance from the plurality of positions determined by the position detection unit 1440, the audio data selection unit 1481 divides the audio data corresponding to the image data according to the range. The audio data selection unit 1481 transmits the audio data which is divided according to the range to each of the audio output devices based on the information about the ranges obtained by the information obtaining unit 1482. Accordingly, the sound which is suitable to a range of the rated frequency of the audio output device can be output.

The present invention also can be realized by executing the following processing. More specifically, software (i.e., a program) which realizes the functions of the above described exemplary embodiments is supplied to a system or an apparatus via a network or various computer readable storage media and causes the system or a computer of the apparatus (or a central processing unit (CPU) or a microprocessor unit (MPU)) to read out the program and to execute it.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-158187 filed Jul. 2, 2009, which is hereby incorporated by reference herein in its entirety.

What is claimed is:

1. A display control apparatus comprising:
a display control unit configured to cause a display screen to display a content;
a detection unit configured to detect approach between an audio output device and the display screen;
a determination unit configured to determine a position of the audio output device of which approach to the display screen is detected by the detection unit, on the display screen; and
a transmission control unit configured to convert, based on the number of audio output devices detected by the detection unit and posited within a predetermined distance from the content, to convert audio data corresponding to the content into a plurality of audio channels, and to transmit the plurality of channels to the audio output device or audio output devices posited within the predetermined distance from the content.

2. The display control apparatus according to claim 1, wherein the display control unit causes the display screen to display thereon a range indicating image which indicates a range within the predetermined distance from a position on the display screen determined by the determination unit, and
wherein the transmission control unit transmits to the audio output device posited within the predetermined distance from the content, audio data corresponding to a content of which display area overlaps with the range indicating image.

3. The display control apparatus according to claim 1, further comprising:
an information obtaining unit configured to obtain information about a range of the audio output device,
wherein, when there is a piece of content to be displayed at a position within the predetermined distance from each of a plurality of positions determined by the determination unit, the transmission control unit determines audio data to be transmitted such that the audio data corresponding to the piece of content is divided according to the range and is transmitted to the audio output device according to information about the range.

4. The display control apparatus according to claim 1, wherein the display screen which displays the content is horizontally disposed.

5. The display control apparatus according to claim 1, wherein the transmission control unit divides audio data corresponding to the content according to the range based on the number of the audio output devices and transmits the divided audio data to each of the audio output devices.

6. The display control apparatus according to claim 1, wherein the detection unit detects the audio output device moved to a detectable range on the display screen.

7. The display control apparatus according to claim 1, wherein the transmission control unit divides the audio data into a plurality of different audio channels, and transmits the plurality of different audio channels to the audio output device or audio output devices posited within the predetermined distance from the content.

8. A method for a display control apparatus, the method comprising:
 causing a display screen to display a content;
 detecting approach between an audio output device and the display screen;
 determining a position of the audio output device of which approach to the display screen is detected, on the display screen; and
 converting, based on the detected number of audio output devices and posited within a predetermined distance from the content, audio data corresponding to the content into a plurality of audio channels, and transmitting the plurality of audio channels to the audio output device or audio output devices posited within the predetermined distance from the content.

9. The method according to claim 8,
 wherein causing a display screen to display a content includes causing the display screen to display thereon a range indicating image which indicates a range within the predetermined distance from a determined position on the display screen, and
 wherein transmitting includes transmitting to the audio output device posited within the predetermined distance from the content, audio data corresponding to a content of which display area overlaps with the range indicating image.

10. The method according to claim 8, further comprising:
 obtaining information about a range of the audio output device,
 wherein, when there is a piece of content to be displayed at a position within the predetermined distance from each of a plurality of determined positions, transmitting includes determining audio data to be transmitted such that the audio data corresponding to the piece of content is divided according to the range and is transmitted to the audio output device according to information about the range.

11. The method according to claim 8, wherein the display screen which displays the content is horizontally disposed.

12. The method according to claim 8, wherein transmitting includes dividing audio data corresponding to the content according to the range based on the number of the audio output devices and transmitting the divided audio data to each of the audio output devices.

13. A non-transitory computer readable storage medium storing a program to cause a display control apparatus to perform a method, the method comprising:
 causing a display screen to display a content;
 detecting approach between an audio output device and the display screen;
 determining a position of the audio output device of which approach to the display screen is detected, on the display screen; and
 converting, based on the detected number of audio output devices and posited within a predetermined distance from the content, audio data corresponding to the content into a plurality of audio channels, and transmitting the plurality of audio channels to the audio output device or audio output devices posited within the predetermined distance from the content.

* * * * *